No. 872,814. PATENTED DEC. 3, 1907.
W. W. HARRIS.
COMBINED PLANTER AND FERTILIZER DISTRIBUTER.
APPLICATION FILED NOV. 9, 1906.
3 SHEETS—SHEET 1.
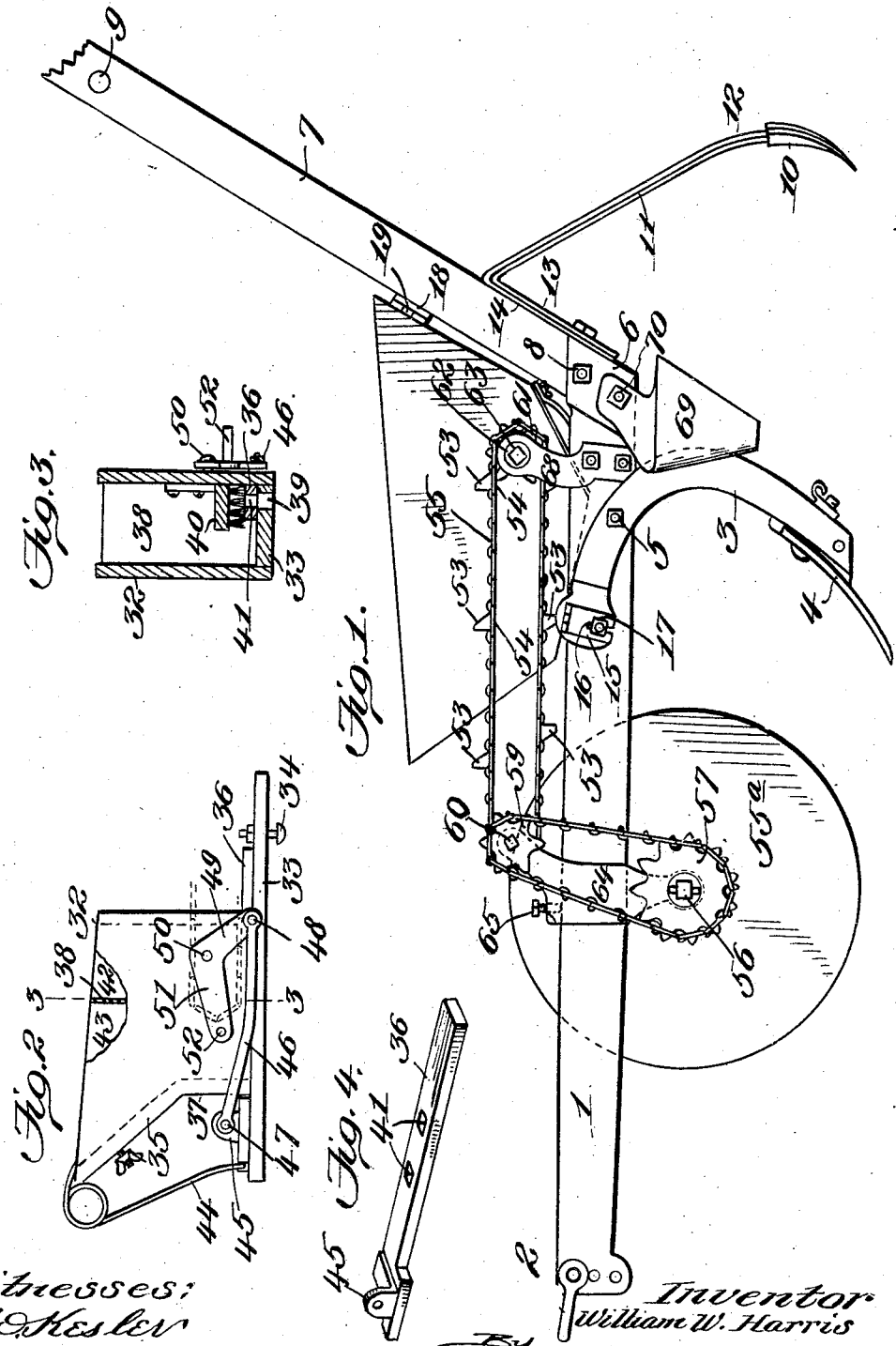
Witnesses:
Inventor
William W. Harris
By
James L. Norris
Atty.

No. 872,814. PATENTED DEC. 3, 1907.
W. W. HARRIS.
COMBINED PLANTER AND FERTILIZER DISTRIBUTER.
APPLICATION FILED NOV. 9, 1906.
3 SHEETS—SHEET 2.
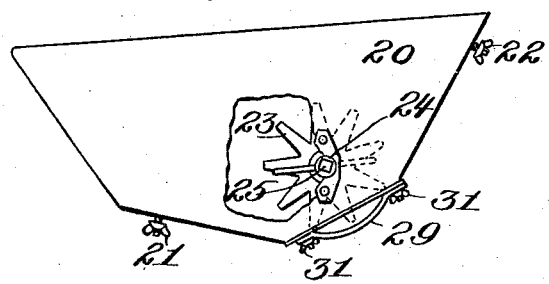
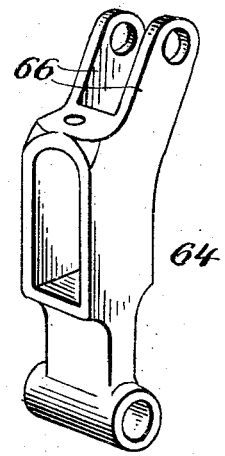
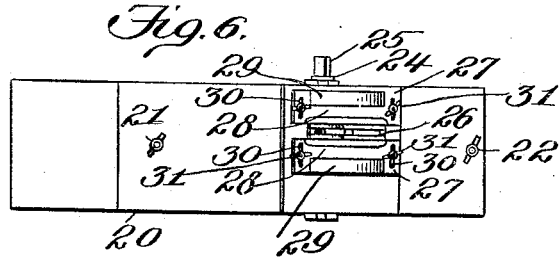
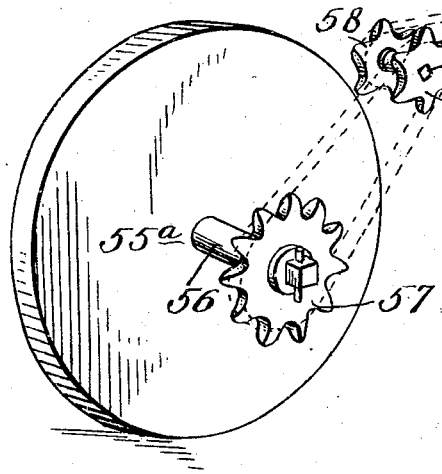
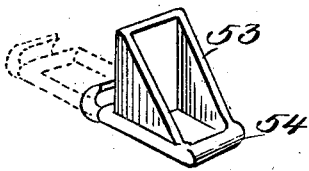
Witnesses:
Inventor
William W. Harris
By James L. Norris
Atty.

No. 872,814. PATENTED DEC. 3, 1907.
W. W. HARRIS.
COMBINED PLANTER AND FERTILIZER DISTRIBUTER.
APPLICATION FILED NOV. 9, 1906.
3 SHEETS—SHEET 3.
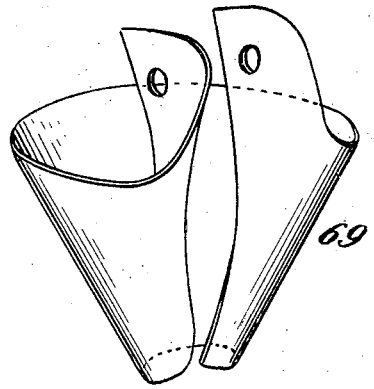
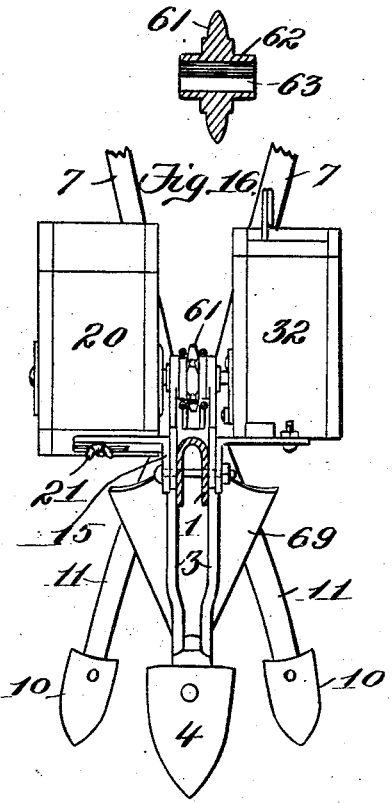
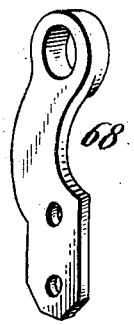
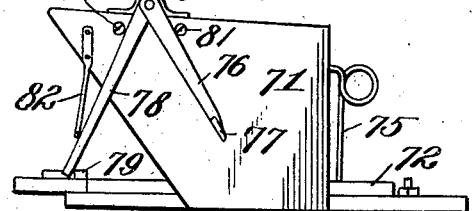
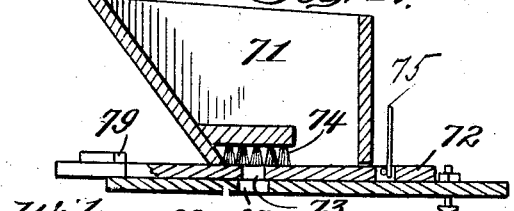
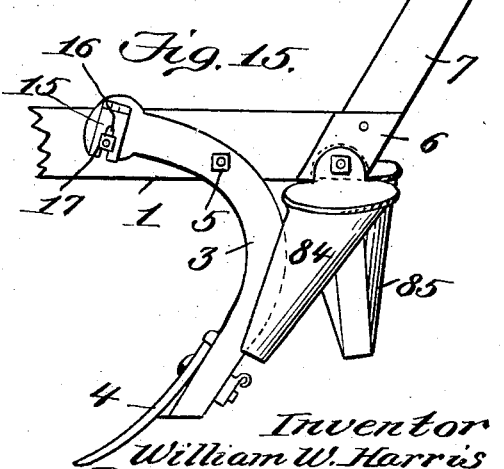
Witnesses
Inventor
William W. Harris
By James L. Norris
Atty.

UNITED STATES PATENT OFFICE.

WILLIAM W. HARRIS, OF SPARTANBURG, SOUTH CAROLINA.

COMBINED PLANTER AND FERTILIZER-DISTRIBUTER.

No. 872,814.   Specification of Letters Patent.   Patented Dec. 3, 1907.

Application filed November 9, 1906. Serial No. 342,645.

*To all whom it may concern:*

Be it known that I, WILLIAM W. HARRIS, a citizen of the United States, residing at Spartanburg, in the county of Spartanburg and State of South Carolina, have invented new and useful Improvements in a Combined Planter and Fertilizer-Distributer, of which the following is a specification.

This invention relates to agricultural implements, and has for its object to provide, in a manner as hereinafter set forth, a combined furrow opener, seed planter, fertilizer distributer and furrow closer.

A further object of the invention is to provide means whereby the operating mechanism for the seeding device and fertilizer distributer can be adjusted, thereby providing for different lengths of movement-transmitting devices.

A further object of the invention is to provide the operating mechanism for the seed box with means for regulating the dropping of the seed so that the same can be deposited at varying distances between the hills.

A further object of the invention is to provide an agricultural implement of the character referred to with means whereby the seed and fertilizer are drilled simultaneously, or one in advance of the other and to further provide means for covering the furrow opened immediately upon the dropping of the seed and the fertilizer.

A further object of the invention is to provide an agricultural implement of the class referred to, which shall be comparatively simple in its construction, strong, durable, efficient in its use, and readily set up.

With the foregoing and other objects in view, the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings, wherein like reference characters denote corresponding parts throughout the several views—Figure 1 is a side elevation of an agricultural implement in accordance with this invention, with the seed box removed. Fig. 2 is a side view of the seed box showing the operating mechanism for the seed feed slide thereof. Fig. 3 is a section on line 3—3 of Fig. 2. Fig. 4 is a detail of the slide. Fig. 5 is a side view of the fertilizer hopper with one side wall broken away, showing the agitator therein. Fig. 6 is a view of the bottom of one of the hoppers. Fig. 7 is a perspective view of the adjustable bearing bracket for the operating wheel. Fig. 8 is a view showing the operating wheel and the movement-transmitting mechanism. Fig. 9 is a view showing one of the elements of the movement-transmitting mechanism, and also showing the adjustable tripping means for the seeding device. Fig. 10 is a detail showing the spout which is secured to the rear of the plow beam. Fig. 11 is a detail of the sprocket wheel for operating the agitator in the fertilizer hopper. Fig. 12 is a detail of one of the brackets for supporting the sprocket wheel shown in Fig. 11. Fig. 13 is a side view of a modified form of seed box, and also showing a modified form of operating means for the slide. Fig. 14 is a section of the seed box shown in Fig. 13. Fig. 15 is a view showing a pair of conductor spouts, one for the seed and the other for the fertilizer and Fig. 16 is a transverse section looking to the rear showing the implement provided with a seed box and fertilizer hopper.

Referring to the drawings by reference characters, 1 denotes a suitable plow beam, having a clevis 2 at its forward end and near its rear end a plow share standard 3, to which is attached a share 4. The standard 3 straddles the rear of the plow beam 1 and is connected thereto by hold-fast devices 5. The rear end of the plow beam 1 is provided with a socket 6 into which extends the lower ends of the handles 7. The lower ends of the handles 7 are fixedly secured in the socket 6 by the holdfast devices 8 and the said handles diverge at their upper portions from one another and are braced apart through the medium of a cross-rod 9. At the rear end of the beam 1 a pair of furrow closers or covers 10 is positioned, each of which is carried on the lower end of an arm 11. The arms 11 converge with respect to each other and their lower portions are formed in a curvilinear manner, as at 12. One of the arms 11 has the upper portion thereof bent downwardly at an inclination and is positioned against the rear of the handles 7 at the lower end thereof. The said portion is indicated by the reference character 13 and is fixedly secured in position. The other arm 11 has its upper portion bent downwardly at an inclination as at 14 and is secured to the bent portion 13 of the other arm 11. This manner of setting up the arms 11 attains a certain amount of resiliency therefor. Secured to the upper end of the standard 3 or to the beam 1 and projecting laterally from each side thereof is an angle-shaped supporting member 15, both arms thereof being slotted, as at 16. By slotting the vertically-extending arms of the members 15 the said members can be vertically adjusted. The securing means for the members 15 is indicated by the reference character 17. Connected to the handles, forwardly thereof, at a height greater than the bend in the arms 11, is a cross-piece 18 which extends transversely, and at each end is formed with a slot 19. The slots 19 in the cross-piece 18 associate with the slots 16 in the horizontally-extending arms of the angle-shaped members 15 and the said cross-piece 18 and the horizontally-extending arms of the angular members act as supports for the fertilizer hopper and seed box, which will be hereinafter referred to.

The fertilizer hopper is indicated by the reference character 20 (see Fig. 5) and is adjustably connected in position through the medium of the attaching devices 21, which extend through the bottom of the hopper to the horizontally-extending arm of one of the angular members 15 and is furthermore adjustably connected to the cross member 18 by the attaching device 22, which extends through the rear wall of the hopper. The latter is provided with an agitator 23 carried by a shaft 24 which is journaled in the side walls of the hopper 20 and one side of said shaft 24 projects from the inner wall of the hopper and is squared, as at 25, for the purpose of coupling the shaft 24 with an operating means therefor. The hopper bottom at one side is formed with an outlet opening 26 into which extend the arms of the agitator 23. Secured to the lower face of the bottom of the hopper 20 is a pair of regulating plates 27 which are adjustable towards and away from each other so as to increase or decrease the amount of fertilizer discharged through the outlet 26. The regulating plates 27 each has a flat portion 28 and a curved portion 29. Each end of each of the plates 27 is slotted, as at 30 so that the plates can be adjustably connected by the hold-fast devices 31 to the bottom of the hopper. When the flat portions of the plates 27 are turned towards the arms of the agitator wheel the arms will extend between them and entirely through the discharge slot or outlet 26, consequently the seed or the supply will always be had. By moving the plates 27 closely together the supply will be diminished, whereas if the plates are drawn apart the supply will be increased. By shifting the plates 27 so that the curved portions of the plates will oppose one another it will be evident that the plates can be moved to abutting position so as to entirely cut off the supply of fertilizer. This will be evident owing to the fact that the curved portions depend and the arms of the agitator 23 will not extend entirely between the plates as is the case when the flat portions of the plates oppose one another.

The seed box (see Fig. 2) is indicated by the reference character 32 and has its bottom 33 projecting forwardly and rearwardly thereof. The forwardly-projecting portion of the bottom 33 is adjustably connected by the attaching device 34 to the horizontally-extending arm of the other of the angular members 15. The seed box is also adjustably connected to the cross-piece 18 by the attaching device 35, which extends through the rear wall of the seed box near the top thereof. The bottom 33 acts as a support for the seed feed slide 36, the latter extending through the front and rear walls of the seed box, suitable openings being provided for such purpose, the openings being arranged in close proximity to the inner side wall 37 of the seed box at the bottom thereof. The seed box is divided into two compartments by the partition 38 and the said partition is arranged over an outlet 39 in the bottom 33. The partition 38 has secured thereto, a brush or cut off 40, which is interposed between the slide 36 and the partition, and the said brush is arranged over the openings 39, the function of the brush being to provide a means of preventing more seed than is carried by the opening 41 in the slide from falling through the opening when it comes opposite the opening in the bottom of the hopper or box, one of the openings being adapted to carry the seed from the compartment 42 and the other of the openings being adapted to carry the seed from the compartment 43 of the seed box. If the brush was a solid one the seeds sticking up, partly in and partly above the opening 41, would be sheared off and broken between the edge of the hole and the edge of the block. The brush stops the surplus seed, yet will not shear them. Openings 41 are arranged so that the seed will be carried alternately from the compartments 42, 43 to the outlet opening 39 and the seed is then brushed, if it does not fall through the opening 39, by pressure of the brush 40. A spring member 44 is secured to the seed box and engages the slide for moving it to and keeping it in normal or inoperative position after being operated, the operating means for the slide working against the pressure of the spring member 44. Although the spring member is shown as attached to the wall of the box and extending down and engaging with the slide 36, yet it is obvious that any form of spring element for moving the slide to and retaining it in inoperative position can be employed. The slide 36 is of such length as to extend upon the projecting portions of the bottom 33 and that part of the slide 36 which projects upon the rearwardly-extending portion of the bottom 33 is provided with a bracket 45, to which is connected the operating or shifting means for the slide 36. The said means consists of a link 46 which is pivotally connected at one end, as at 47, to the bracket 45 and at its other end is pivotally connected, as at 48, to the shorter arm 49 of a bell-crank lever, the latter being pivoted to one side of the seed box, as at 50. The long arm 51 of the bell-crank lever has its free end provided with a laterally-projecting stud 52, which extends into the path of a tripping means therefor, which consists of a beveled extension 53, formed on a link 54, the latter constituting a part of a transmission belt 55. The transmission belt 55 is provided with a plurality of links 54, each having a beveled portion 53. These links 54 are detachably secured in position so they can be disposed at various portions throughout the length of the transmission belt 55 and regulate the time when the bell-crank lever is tripped so as to enable the dropping of the seed to be had at varying distances.

The transmission belt 55 forms a part of the operating mechanism for the seeding device and fertilizer distributer. The other element of said operating mechanism consists of the operating wheel 55ª, its shaft or axle 56, sprocket 57, a pair of sprocket pinions 58, 59 carried by a shaft 60, a belt connection between the sprocket 57 and the pinion 59, a sprocket pinion 61 provided with a hub 62 projecting from each side thereof, the hub having a square opening 63. The transmission belt 55 connects the sprocket pinion 58 with the sprocket pinion 61. The shaft 56 is carried by the lower portion of a bracket 64, which is slidably adjustable upon the plow beam 1 so as to provide for varying lengths of transmission belts 55. The bearing bracket 64 is secured in its adjusted position by a set screw 65. The shaft 56 is journaled in the lower portion of the bracket 64, that is to say, it is positioned below the beam. The bracket 64 is provided with an upwardly-extending pair of arms 66, in which is journaled the shaft 60 carrying the sprocket pinions 58, 59, the sprocket pinion 58 being mounted upon the shaft 60 between the arms 66. At the rear of the plow beam a pair of upwardly-extending arms 68 is secured, which constitute bearings for the shaft 62 and between the said arms 68 is positioned the sprocket pinion 61. The latter is adapted to receive the squared end 25 of the shaft 24 of the agitator 23 so that when motion is transmitted to the sprocket pinion 61 by the transmission belt 55 the agitator 23 will be operated.

Depending from the socket 6 is a conductor spout 69, which is common to the fertilizer hopper and seed box so that the seed and fertilizer will be distributed to the furrow opening. The conductor spout 69 is secured in position through the medium of the holdfast devices 70.

A modified form of seed box, as shown in Figs. 13 and 14 is indicated by the reference character 71 and it is formed of one compartment. The seed feed slide is indicated by the reference character 72 and is provided with a single feed-carrying opening 73. The brush or cut-off is indicated by the reference character 74 and the spring for normally retaining the slide in its normal or inoperative position is designated by the reference character 75. The operating means for the slide 72 consists of a bell-crank lever having the shorter arm 76 thereof provided with an enlargement 77 arranged in the path of the tripping elements and the elongated arm 78 thereof extending in the path of a protuberance 79 projecting from the rear of the slide 72. The bell-crank lever is pivotally mounted upon a support 80, projecting over and from one wall of the seed box. The support 80 is fixedly secured to the seed box by the hold-fast device 81. A resilient member 82 depends from one wall of the seed box and acts as a buffer for the elongated arm of the bell-crank. When the tripping elements engage the enlarged end of the shorter arm of the bell-crank, it carries the same forward which moves the slide 72 therewith, so that, when released, the action of the spring 75 will force the slide 72 in an opposite direction and cause the seed to be carried to the outlet 83. The brush will then come into operation and the excess seed will be removed from the carrying opening 73 in the slide and discharged through the outlet 83 into the conductor spout.

In Fig. 15 of the drawings a pair of conductor spouts 84, 85 is provided, the spout 84 being for the discharge of the fertilizer and is positioned close behind the plow standard 3, while the spout 85 is for the seed and is positioned at the rear of the spout 84. By such an arrangement it will cause the fertilizer to fall close behind the plow and it will be covered by the first earth that falls in the furrow behind the plow. The seed will fall further back after the fertilizer has been covered.

Owing to the fact that the shaft 62 is provided with a square opening entirely therethrough it will be evident that a fertilizer agitator and a seed drill can be operated from each side of the plow beam, that is to say, in lieu of employing a seed box upon one side and a fertilizer hopper upon the other, a hopper and a seed drill can be secured in position and the agitators of the hopper and drill operated from the shaft as the squared ends of the shafts of the agitators can extend in the square opening of the shaft 62.

Owing to the manner of setting up the fertilizer hopper or seed drill it will be evident that it can be adjusted to a position so that the shaft of its agitator will be unclutched from the shaft 62 so, therefore the agricultural implement can be used without operating the agitator within the hopper or drill. The same adjustment can be had with respect to the seed box as it can be shifted laterally upon the angular member 15 and one end of the cross-piece 18, so that that arm of the bell-crank which is in the path of the tripping elements can be moved out of the path, and under such circumstances the operation of the seed feed carrying slide discontinued.

By partitioning the seed box in a manner as stated, one compartment thereof can be used for fertilizer and the other compartment for seed, or, in lieu of providing the seed box with two compartments it can be set up with a single compartment as shown in Figs. 13 and 14, and with the employment of either form of bell-crank for shifting or operating the seedfeed slide.

Owing to the manner in which the furrow closers or covers are arranged the furrows will be closed immediately after the dropping of the seed and the fertilizer.

What I claim is—

1. An agricultural implement comprising an operating means for a fertilizer distributer and a seed device, said operating means embodying a transmission element having a plurality of tripping devices for operating the seeder, and a sprocket pinion operated by said element and having its shaft engaging with the fertilizer distributer for operating it.

2. An agricultural implement comprising an operating means for a fertilizer distributer and a seed device, said operating means embodying a transmission element having a plurality of tripping devices for operating the seeder, a sprocket pinion operated by said element and having its shaft engaging with the fertilizer distributer for operating it, means for operating said transmission element, and a support therefor.

3. An agricultural implement comprising an operating means for a fertilizer distributer and a seed device, said operating means embodying a transmission element having a plurality of tripping devices for operating the seeder, a sprocket pinion operated by said element and having its shaft engaging with the fertilizer distributer for operating it, means for operating said transmission element, and a support therefor, said support being adjustable to provide for varying lengths of transmission elements.

4. An agricultural implement comprising a plow, a fertilizer distributing means carried thereby, a seeding device carried thereby, means for operating said fertilizer distributing means and said seeding device, and a shiftable means for operating the operating means for the fertilizer distributing means and seeding device.

5. An agricultural implement comprising a plow, a fertilizer distributing means carried thereby, a seeding device carried thereby, means for operating said fertilizer distributing means and said seeding device, a shiftable means for operating the operating means for the fertilizer distributing means and seeding device, and furrow closers connected to the plow.

6. An agricultural implement comprising a plow, fertilizer distributing means adjustably connected thereto, a seeding device adjustably connected thereto, operating means for the fertilizer distributing means and the seeding device, and a shiftable means for operating the operating means for the fertilizer distributing means and the seeding device.

7. An agricultural implement comprising a plow, fertilizer distributing means adjustably connected thereto, a seeding device adjustably connected thereto, operating means for the fertilizer distributing means and the seeding device, a shiftable means for operating the operating means for the fertilizer distributing means and the seeding device, and conducting means for the discharged fertilizer and seed.

8. An agricultural implement comprising a plow, fertilizer distributing means adjustably connected thereto, a seeding device adjustably connected thereto, operating means for the fertilizer distributing means and the seeding device, a shiftable means for operating the operating means for the fertilizer distributing means and the seeding device, conducting means for the discharged fertilizer and seed, and furrow closers connected with the plow.

9. An agricultural implement comprising the combination with a plow, a fertilizer distributer and a seeding device carried thereby, of means for operating said distributer and seeding device, said means consisting of a sprocket supported upon the plow beam and engaging with the fertilizer distributer for operating it, another sprocket supported by the beam, a belt traveling over said sprockets for operating the first-mentioned sprocket, means carried by the belt for operating the seeding device, and means for driving the belt.

10. An agricultural implement comprising an operating means for a pair of supply devices, said operating means embodying a transmission element having a plurality of tripping devices for operating one of the supply devices and a sprocket pinion operated by said element and having its shaft engaging with the other supply device for operating it.

11. An agricultural implement comprising an operating means for a pair of supply devices, said operating means embodying a transmission element having a plurality of tripping devices for operating one of the supply devices, a sprocket pinion operated by said element and having its shaft engaging with the other supply device for operating it, means for operating said transmission element, and a support therefor.

In testimony whereof I have hereunto set my hand in presence of two subscribing witnesses.

WILLIAM W. HARRIS.

Witnesses:
   D. CALLAHAN,
   N. T. FOWLER.